United States Patent
Gurumurthy et al.

(10) Patent No.: US 11,852,895 B2
(45) Date of Patent: Dec. 26, 2023

(54) SYSTEM AND METHOD FOR OBTAINING OPTIMAL FOCUS OF AN IMAGE CAPTURING DEVICE

(71) Applicant: E-CON SYSTEMS INDIA PRIVATE LIMITED, Chennai (IN)

(72) Inventors: Krithika Gurumurthy, Chennai (IN); Naresh Rajasekar, Chennai (IN)

(73) Assignee: E-CON SYSTEMS INDIA PRIVATE LIMITED

( * ) Notice: Subject to any disclaimer, the term of this patent is extended or adjusted under 35 U.S.C. 154(b) by 173 days.

(21) Appl. No.: 17/681,925

(22) Filed: Feb. 28, 2022

(65) Prior Publication Data

US 2023/0273399 A1    Aug. 31, 2023

(51) Int. Cl.
 *G02B 7/38* (2021.01)
 *H04N 17/00* (2006.01)

(52) U.S. Cl.
 CPC ............. *G02B 7/38* (2013.01); *H04N 17/002* (2013.01)

(58) Field of Classification Search
 CPC ........ G02B 7/38; H04N 17/002; H04N 23/67; H04N 5/265; H04N 23/951; G06T 5/50; G06T 3/4038; G06T 7/50; G06T 2207/20024; G06T 2207/20212; G06T 2207/10148; G06T 2207/20221; G06T 1/0007
 See application file for complete search history.

(56) References Cited

U.S. PATENT DOCUMENTS

| | | | |
|---|---|---|---|
| 4,812,912 A | 3/1989 | Iida et al. | |
| 2007/0002152 A1 | 1/2007 | Fujiwara | |
| 2009/0238435 A1* | 9/2009 | Shields | G01N 21/6458 382/133 |
| 2015/0227022 A1 | 8/2015 | Fluckiger | |
| 2018/0115698 A1 | 4/2018 | Hokoi | |
| 2018/0176452 A1* | 6/2018 | Nikkanen | H04N 17/002 |
| 2018/0183991 A1* | 6/2018 | Li | G02B 7/36 |
| 2020/0412937 A1* | 12/2020 | Huang | H04N 23/611 |
| 2021/0082149 A1* | 3/2021 | Sheorey | G06T 3/4007 |
| 2022/0392036 A1* | 12/2022 | Feng | H04N 23/951 |

* cited by examiner

*Primary Examiner* — Lin Ye
*Assistant Examiner* — Tuan H Le
(74) *Attorney, Agent, or Firm* — Jason C. Cameron

(57) ABSTRACT

An image capturing module receives a predetermined number of a first set of frames by calibration of the image capturing device. An image processing module calculates focal values of each of the predetermined number of the first set of frames using a focal value calculation technique, identifies a predefined threshold of the focal value among each of the focal values calculated, determines a reference frame among each of the predetermined number of the first set of frames. An image comparison module compares focal value of one or more live frames with the focal value of reference frame, selects an optimal live frame from the one or more live frames when the focal value of the one or more live frames is greater than predefined percentage of the focal value of the reference frame. A notification module notifies an achievement of an optimal focal value range corresponding to the optimal live frame to an operator through one or more notification means.

12 Claims, 4 Drawing Sheets

SYSTEM AND METHOD FOR OBTAINING OPTIMAL FOCUS OF AN IMAGE CAPTURING DEVICE

BACKGROUND

Embodiments of the present disclosure relate to a focus calibrating system and more particularly to a system and a method for obtaining optimal focus of an image capturing device.

Embedded vision is an exciting new technology in the vision industry. It has the potential to open new applications and shape the future of entire industries. The embedded vision refers to the integration of a camera and processing board. The embedded vision systems are typically built for specific applications like self-driving cars, autonomous vehicles in agriculture, digital derma scopes that help specialists make more accurate diagnoses, among many other unique and cutting-edge applications. For various applications of the embedded vision technology, a wide range of embedded vision cameras are used that includes mobile industry processor interface (MIPI) camera modules, GMSL cameras, stereo cameras and the like with resolution ranging from 1 MP to 16 MP. These cameras are designed to work with high-end processors like NVIDIA® Jetson™, NXP i.MX8, Rockchip, Raspberry Pi 4, Google coral, Xilinx and the like. Generally, for the embedded vision cameras, focus alignment is one of the critical task which requires expertise of the operator. As a result, various approaches are available which are designed for focus alignment to obtain optimal focus of an image.

Conventionally for performing focus alignment manually, an operator may have to be afraid to fail now and then. The operator may not always be fast enough and accurate to get the subject in focus as working with a manual focus lens is error prone. Also, it is difficult and time consuming to check the preview very frequently to ensure for the achieved focus. Moreover, light intensity of the scene is a major parameter in obtaining the accurate parameter value. In addition, maintaining the lux during the focus fine tuning calls for a dedicated costlier environment or test set up is also expensive. Also, any change or disturbance in the focus target in the calibration set up drastically impacts the focusing and may go unattended during the focus operation.

Hence, there is a need for an improved system and a method for obtaining optimal focus of an image capturing device in order to address the aforementioned issues.

BRIEF DESCRIPTION

In accordance with an embodiment of a present disclosure, a system for obtaining optimal focus of an image capturing device is disclosed. The system includes a processing subsystem hosted on a server and configured to execute on a network to control bidirectional communications among a plurality of modules. The processing subsystem includes an image capturing module configured to receive a predetermined number of a first set of frames by calibration of the image capturing device. The processing subsystem includes an image processing module operatively coupled to the image capturing module, wherein the image processing module is configured to calculate focal values of each of the predetermined number of the first set of frames using a focal value calculation technique. The image processing module is configured to identify a predefined threshold of the focal value among each of the focal values calculated for each of the predetermined number of the first set of frames. The image processing module is also configured to determine a reference frame among each of the predetermined number of the first set of frames based on the predefined threshold of the focal value identified. The processing module also includes an image comparison module configured to compare focal value of one or more live frames captured using the image capturing device with the focal value of reference frame determined. The image comparison module is also configured to select an optimal live frame from the one or more live frames when the focal value of the one or more live frames is greater than a predefined percentage of the focal value of the reference frame. The processing subsystem also includes a notification module configured to notify an achievement of an optimal focal value range corresponding to the optimal live frame to an operator through one or more notification means.

In accordance with another embodiment of the present disclosure, a method for obtaining optimal focus of an image capturing device is disclosed. The method includes receiving, by an image capturing module of the processing subsystem, a predetermined number of a first set of frames by calibration of the image capturing device. The method also includes calculating, by an image processing module of the processing subsystem, focal values of each of the predetermined number of the first set of frames using a focal value calculation technique. The method also includes identifying, by the image processing module of the processing subsystem, a predefined threshold of the focal value among each of the focal values calculated for each of the predetermined number of the first set of frames. The method also includes determining, by the image processing module of the processing subsystem, a reference frame among each of the predetermined number of the first set of frames based on the predefined threshold of the focal value identified. The method also includes comparing, by an image comparison module of the processing subsystem, focal value of one or more live frames captured using the image capturing device with the focal value of reference frame determined. The method also includes selecting, by the image comparison module of the processing subsystem, an optimal live frame from the one or more live frames when the focal value of the one or more live frames is greater than a predefined percentage of the focal value of the reference frame. The method also includes notifying, by a notification module of the processing subsystem, an achievement of an optimal focal value range corresponding to the optimal live frame to an operator through one or more notification means.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
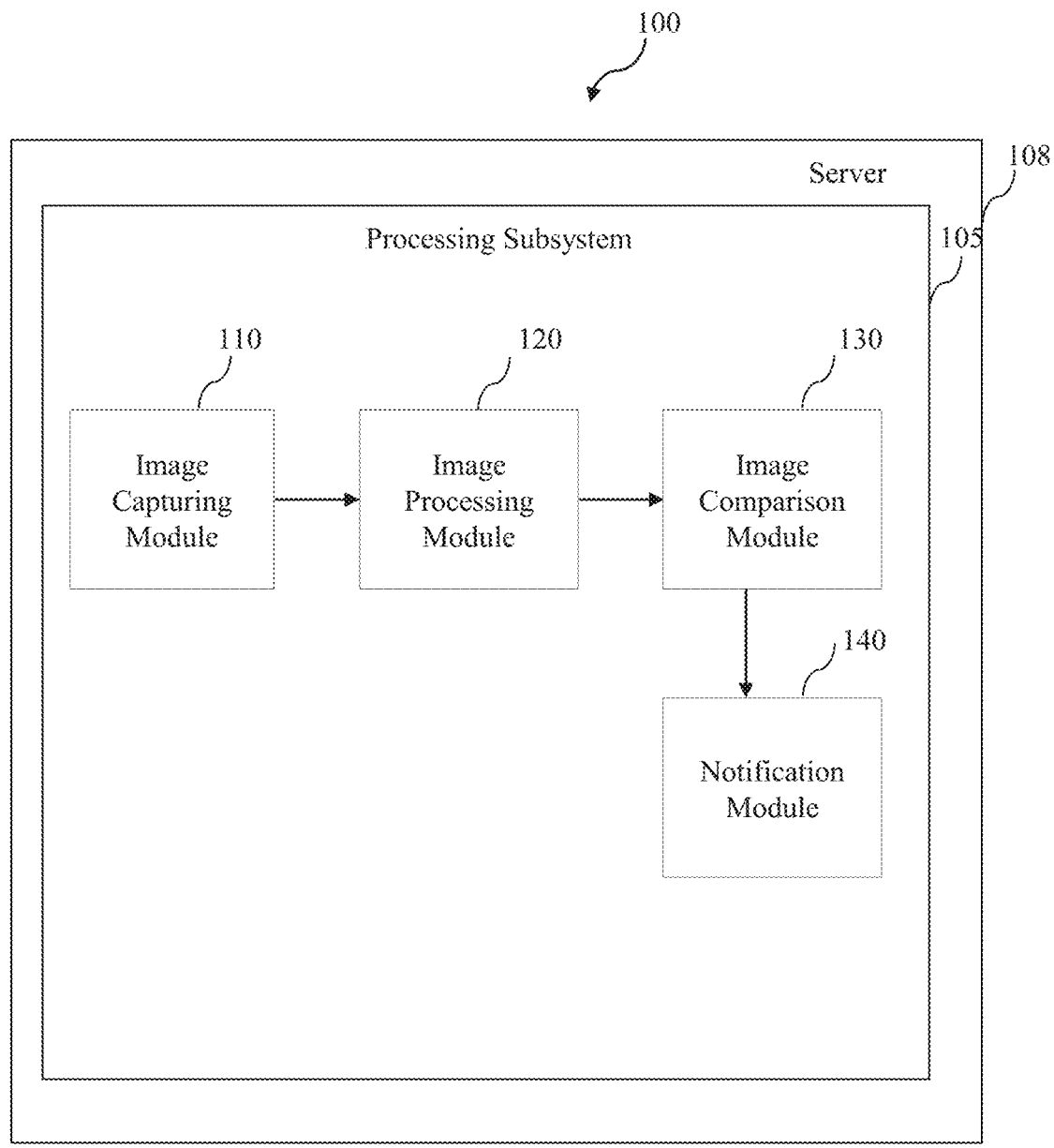
FIG. 1 is a block diagram of a system for obtaining optimal focus of an image capturing device in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting and understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a". "an", and "the" include plural references unless the context clearly dictates otherwise.

Embodiments of the present disclosure relate to a system and a method for obtaining optimal focus of an image capturing device. The system includes a processing subsystem hosted on a server and configured to execute on a network to control bidirectional communications among a plurality of modules. The processing subsystem includes an image capturing module configured to receive a predetermined number of a first set of frames by calibration of the image capturing device. The processing subsystem includes an image processing module operatively coupled to the image capturing module, wherein the image processing module is configured to calculate focal values of each of the predetermined number of the first set of frames using a focal value calculation technique. The image processing module is configured to identify a predefined threshold of the focal value among each of the focal values calculated for each of the predetermined number of the first set of frames. The image processing module is also configured to determine a reference frame among each of the predetermined number of the first set of frames based on the predefined threshold of the focal value identified. The processing module also includes an image comparison module configured to compare focal value of one or more live frames captured using the image capturing device with the focal value of reference frame determined. The image comparison module is also configured to select an optimal live frame from the one or more live frames when the focal value of the one or more live frames is greater than a predefined percentage of the focal value of the reference frame. The processing subsystem also includes a notification module configured to notify an achievement of an optimal focal value range corresponding to the optimal live frame to an operator through one or more notification means.

FIG. 1 is a block diagram of a system 100 for obtaining optimal focus of an image capturing device in accordance with an embodiment of the present disclosure. The system 100 includes a processing subsystem 105 hosted on a server 108 and configured to execute on a network to control bidirectional communications among a plurality of modules. In one embodiment, the server 108 may include a cloud server. In another embodiment, the server 108 may include a local server. The processing subsystem 105 is configured to execute on a network (not shown in FIG. 1) to control bidirectional communications among a plurality of modules. In one embodiment, the network may include a wired network such as local area network (LAN). In another embodiment, the network may include a wireless network such as Wi-Fi. Bluetooth, Zigbee, near field communication (NFC), infra-red communication (RFID) or the like.

The processing subsystem 105 includes an image capturing module 110 configured to receive a predetermined number of a first set of frames by calibration of the image capturing device. In one embodiment, the predetermined number of first set of frames may include two hundred and fifty number (250) of frames. In such embodiment, the predetermined number of first set of frames are received from an image focussed on a focus chart placed at a distance of approximately ten to hundred centimetres (10-100 cm) from the image capturing device. In some embodiment, the image capturing device may include an embedded image capturing device. In such embodiment, the image capturing device may include, but not limited to, mobile industry processor interface (MIPI) camera modules, gigabit multimedia serial link (GMSL) cameras, stereo cameras and the like. In a specific embodiment, the calibration of the image capturing device may include at least one of a manual calibration of lens of the image capturing device or mechanised operation of the image capturing device.

The processing subsystem 105 includes an image processing module 120 operatively coupled to the image capturing module 110. The image processing module 120 is configured to calculate focal values of each of the predetermined number of the first set of frames using a focal value calculation technique. In one embodiment, the focal value calculation technique may include a Laplacian edge detection technique.

The image processing module 120 is configured to identify a predefined threshold of the focal value among each of the focal values calculated for each of the predetermined number of the first set of frames. In some embodiment, the predefined threshold of the focal value is the highest focal value achieved. The image processing module 120 is also configured to determine a reference frame among each of the predetermined number of the first set of frames based on the predefined threshold of the focal value identified.

The processing subsystem 105 also includes an image comparison module 130 configured to compare focal value of one or more live frames captured using the image capturing device with the focal value of reference frame determined. The image comparison module 130 is also configured to select an optimal live frame from the one or more live frames when the focal value of the one or more live frames is greater than a predefined percentage of the focal value of the reference frame. In one embodiment, the predefined percentage of the focal value may include a range of ninety five percent (95%) of the focal value.

The processing subsystem 105 also includes a notification module 140 configured to notify an achievement of an optimal focal value range corresponding to the optimal live frame to an operator through one or more notification means. In one embodiment, the one or more notification means may include at least one of an audible notification, a display notification or a combination thereof. In such embodiment, the display notification may include a sequentially increasing and/or decreasing live focal values of the one or more live frames corresponding to the lens movement of the image capturing device in a plurality of directions to achieve the optimal live frame. In another embodiment, the audible notification may include a beep or an alarm sound to alert the operator.

Figure 2:
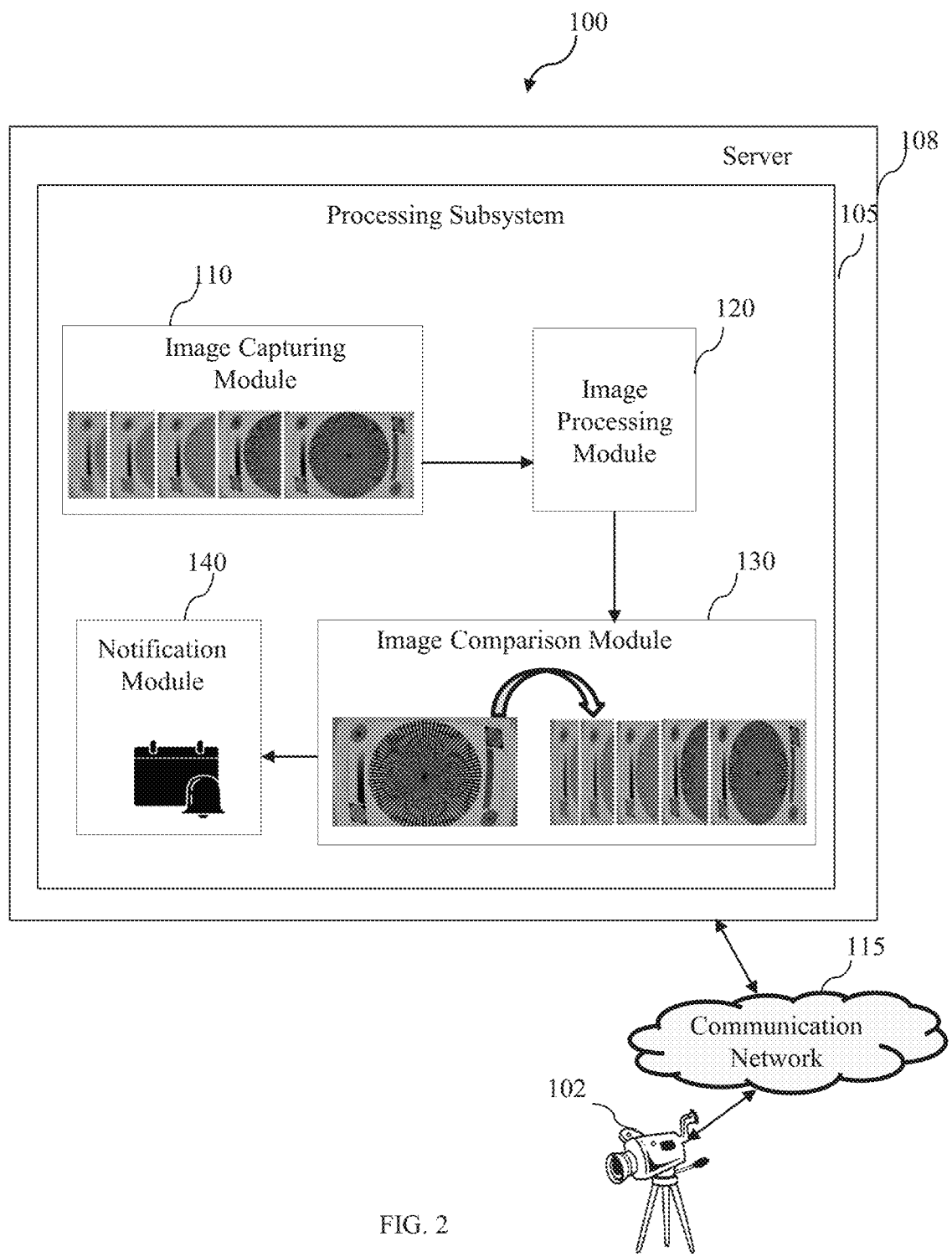
FIG. 2 is a schematic representation of an exemplary embodiment of a system for obtaining optimal focus of an image capturing device of FIG. 1 in accordance with an embodiment of the present disclosure.

FIG. 2 is a schematic representation of an exemplary embodiment of a system 100 for obtaining optimal focus of an image capturing device of FIG. 1 in accordance with an embodiment of the present disclosure. Considering an example, wherein the system 100 is utilised for experimental purpose. In such a scenario, let's assume that an image capturing device 102 is set up and a target point or a focus chart is placed at a certain distance from the image capturing device. In the example used herein, the image capturing device is an embedded vision image capturing device. Here, the focus chart is placed at a distance of approximately ten to hundred centimetres (10-100 cm) from the image capturing device. For experimental purpose, the image capturing device is manually calibrated by an operator. Once, the operator manually rotates the lens of the image capturing device, focus images are displayed on the focus chart. From such focus images, a predetermined number of first set of frames are captured by an image capturing module 110 of a processing subsystem 105 which is hosted on a cloud server 108. For example, the processing subsystem 105 is used herein, at the backend for processing the predetermined number of first set of frames captured. The processing subsystem 105 which is hosted on the cloud server 108 is configured to execute on a wireless communication network 115 to control bidirectional communications among a plurality of modules.

Further, the processing subsystem 105 includes an image processing module 120 which calculates focal values of each of the predetermined number of the first set of frames using a focal value calculation technique. For example, the focal value calculation technique may include a Laplacian edge detection technique. The image processing module 120 is also configured to identify a predefined threshold of the focal value among each of the focal values calculated for each of the predetermined number of the first set of frames. For example, the predefined threshold of the focal value is the highest focal value achieved. The image processing module 120 is also configured to determine a reference frame among each of the predetermined number of the first set of frames based on the predefined threshold of the focal value identified.

Further an image comparison module 130 compares focal value of one or more live frames captured using the image capturing device with the focal value of reference frame determined. The image comparison module 130 is also configured to select an optimal live frame from the one or more live frames when the focal value of the one or more live frames is greater than a predefined percentage of the focal value of the reference frame. In the example used herein, the predefined percentage of the focal value may include a range of ninety five percent (95%) of the focal value.

In addition, a notification module 140 notifies an achievement of an optimal focal value range corresponding to the optimal live frame to an operator through one or more notification means. In the example used herein, the one or more notification means may include at least one of an audible notification, a display notification or a combination thereof. In such an example, the display notification may include a sequentially increasing and/or decreasing live focal values of the one or more live frames corresponding to the lens movement of the image capturing device in a plurality of directions to achieve the optimal live frame. In another example, the audible notification may include a beep or an alarm sound to alert the operator. Using the above-mentioned method, when the operator rotates the lens, he can be aware of the step when enough reference frames are collected which is required to compare with the upcoming frames to calculate the optimal focus level. When the operator rotates the lens further, he is displayed with the message indicating the current focus level (sequentially increasing) so that he can be aware of the direction (left/right) in which the lens must be moved further. This method helps the operator to achieve optimal focus in a quicker time with no decision making required from the operator regarding choosing the focused frame. At the end when the optimal focus is achieved, the operator is indicated with the beep sound which in turn alerts the operator to further stop rotating the lens and freeze the lens in that position.

Figure 3:
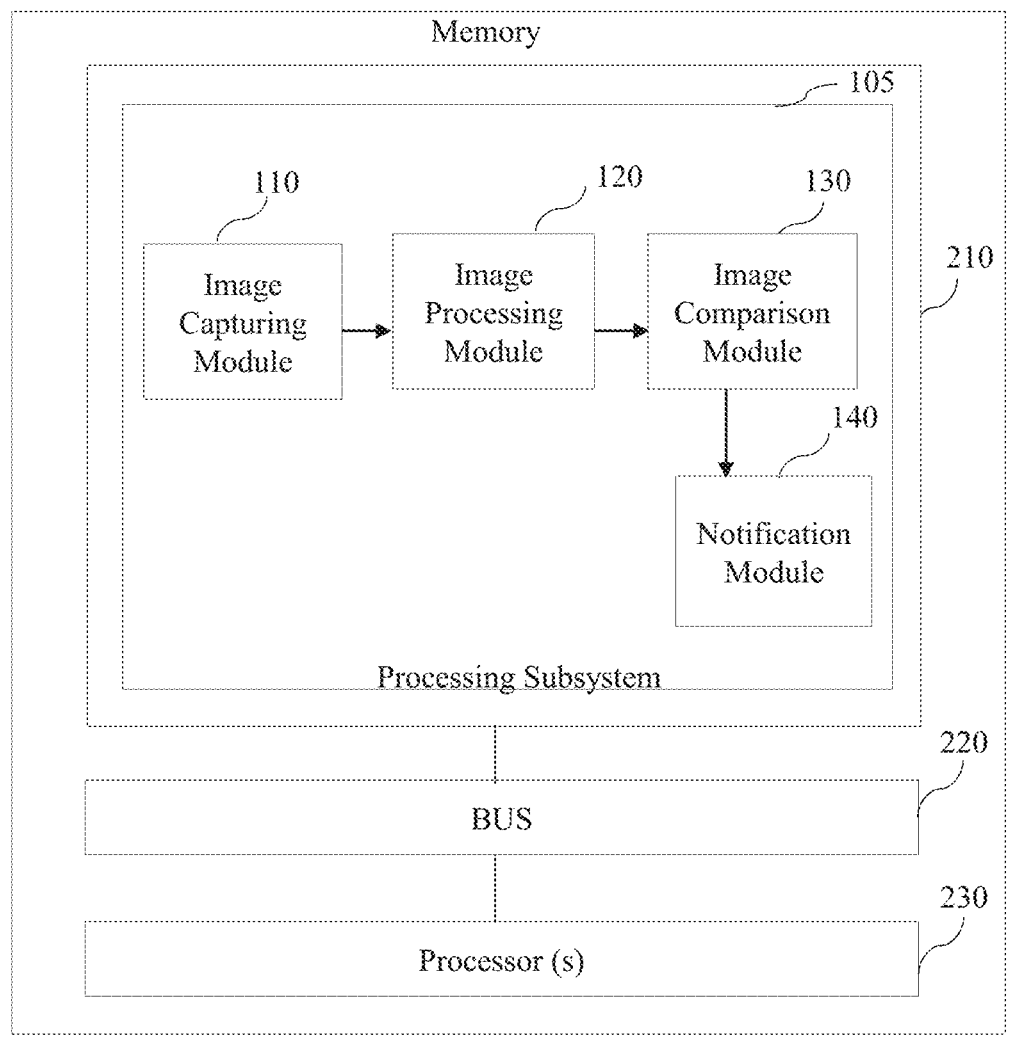
FIG. 3 is a block diagram of a computer or a server in accordance with an embodiment of the present disclosure.

FIG. 3 is a block diagram of a computer or a server in accordance with an embodiment of the present disclosure. The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of executable program which instructs the processor 230 to perform the method steps illustrated in FIG. 1. The memory 210 includes a processing subsystem 105 of FIG. 1. The processing subsystem 105 further has following modules: an image capturing module 110, an image processing module 120, an image comparison module 130 and a notification module 140.

The image capturing module 110 configured to receive a predetermined number of a first set of frames by calibration of the image capturing device. The image processing module 120 is configured to calculate focal values of each of the predetermined number of the first set of frames using a focal value calculation technique. The image processing module 120 is configured to identify a predefined threshold of the focal value among each of the focal values calculated for each of the predetermined number of the first set of frames. The image processing module is also configured to determine a reference frame among each of the predetermined number of the first set of frames based on the predefined threshold of the focal value identified. The image comparison module 130 is configured to compare focal value of one or more live frames captured using the image capturing device with the focal value of reference frame determined. The image comparison module 130 is also configured to select an optimal live frame from the one or more live frames when the focal value of the one or more live frames is greater than a predefined percentage of the focal value of the reference frame. The notification module 140 is configured to notify an achievement of an optimal focal value range corresponding to the optimal live frame to an operator through one or more notification means.

The bus 220 as used herein refers to be internal memory channels or computer network that is used to connect computer components and transfer data between them. The bus 220 includes a serial bus or a parallel bus, w % herein the serial bus transmits data in bit-serial format and the parallel bus transmits data across multiple wires. The bus 220 as used herein, may include but not limited to, a system bus, an internal bus, an external bus, an expansion bus, a frontside bus, a backside bus and the like.

Figure 4:
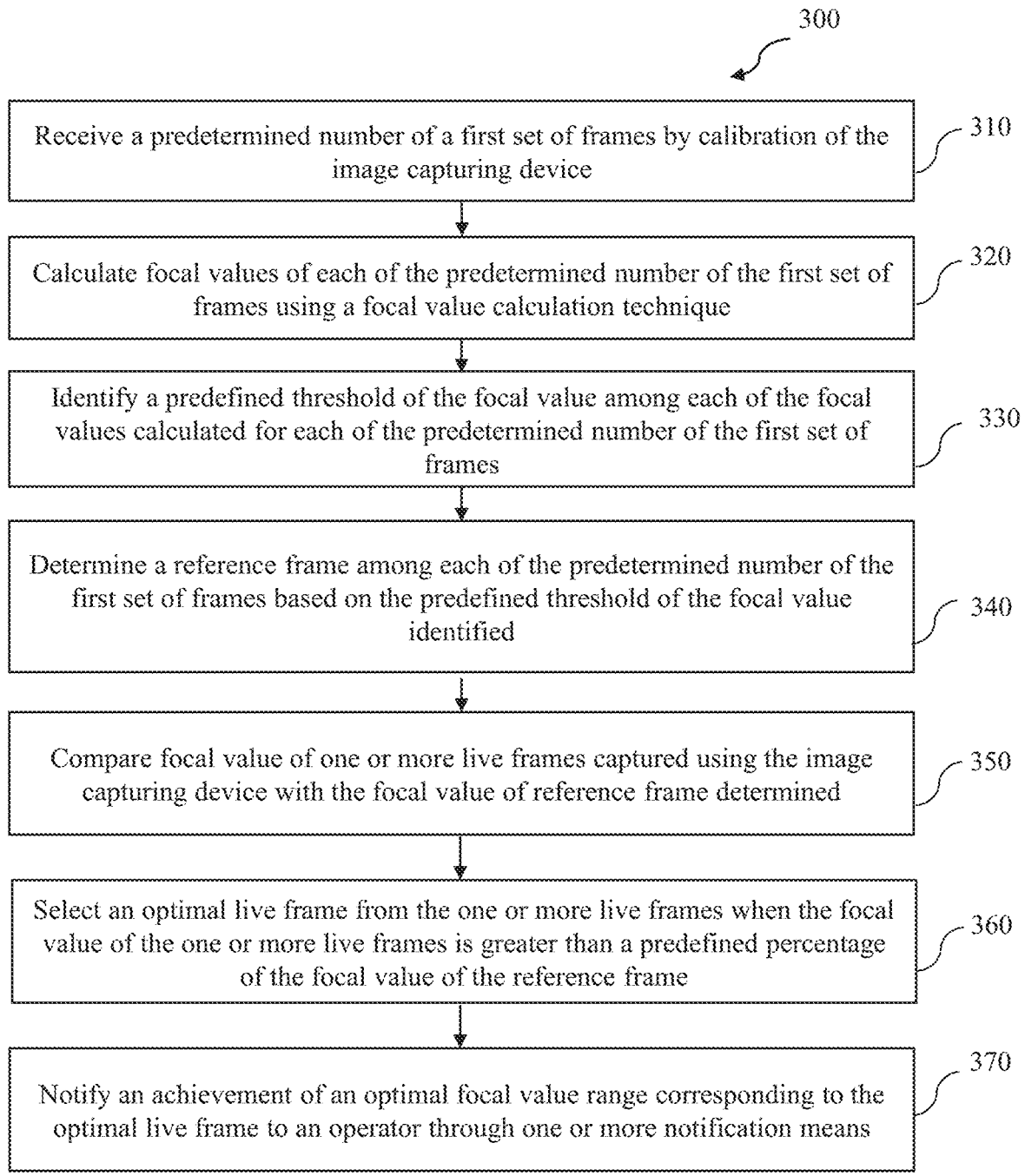
FIG. 4 is a flow chart representing the steps involved in a method for obtaining optimal focus of an image capturing device in accordance with an embodiment of the present disclosure.

FIG. 4 is a flow chart representing the steps involved in a method 300 for obtaining optimal focus of an image capturing device in accordance with an embodiment of the present disclosure. The method 300 includes receiving, by an image capturing module of the processing subsystem, a predetermined number of a first set of frames by calibration of the image capturing device in step 310. In one embodiment, receiving the predetermined number of the first set of frames by calibration of the image capturing device may include receiving two hundred and fifty number (250) of frames. In some embodiment, receiving the predetermined number of first set of frames by calibrating the image capturing device may include receiving the predetermined number of first set of frames by at least one of a manual calibration of lens of the image capturing device or mechanised operation of the image capturing device. In such embodiment, the image capturing device may include, but not limited to, mobile industry processor interface (MIPI) camera modules, gigabit multimedia serial link (GMSL) cameras, stereo cameras and the like.

The method 300 also includes calculating, by an image processing module of the processing subsystem, focal values of each of the predetermined number of the first set of frames using a focal value calculation technique in step 320. In one embodiment, calculating the focal values of each of the predetermined number of the first set of frames using the focal value calculation technique may include calculating the focal values of each of the predetermined number of the first set of frames using a Laplacian edge detection technique.

The method 300 also includes identifying, by the image processing module of the processing subsystem, a predefined threshold of the focal value among each of the focal values calculated for each of the predetermined number of the first set of frames in step 330. In some embodiment, identifying the predefined threshold of the focal value among each of the focal values calculated may include identifying a highest focus value for referring as a reference frame. The method 300 also includes determining, by the image processing module of the processing subsystem, the reference frame among each of the predetermined number of the first set of frames based on the predefined threshold of the focal value identified in step 340.

The method 300 also includes comparing, by an image comparison module of the processing subsystem, focal value of one or more live frames captured using the image capturing device with the focal value of reference frame determined in step 350. The method 300 also includes selecting, by the image comparison module of the processing subsystem, an optimal live frame from the one or more live frames when the focal value of the one or more live frames is greater than a predefined percentage of the focal value of the reference frame in step 360. In some embodiment, selecting the optimal live frame from the one or more live frames when the focal value of the one or more live frames is greater than the predefined percentage of the focal value of the reference frame may include selecting the optimal live frame when the focal value of the one or more live frames is greater than ninety five percent (95%) of the focal value.

The method 300 also includes notifying, by a notification module of the processing subsystem, an achievement of an optimal focal value range corresponding to the optimal live frame to an operator through one or more notification means in step 370. In one embodiment, notifying the achievement of the optimal focal value range corresponding to the optimal live frame to the operator through the one or more notification means may include notifying the achievement of the optimal focal value range at least one of an audible notification, a display notification or a combination thereof. In such embodiment, the display notification may include a sequentially increasing and/or decreasing live focal values of the one or more live frames corresponding to the lens movement of the image capturing device in a plurality of directions to achieve the optimal live frame. In another embodiment, the audible notification may include a beep or an alarm sound to alert the operator.

Various embodiments of the present disclosure provides an approach for achieving optimal focus of the image and ensures to get the best focused frame from all the frames received from the camera while rotating the lens focus ring to fix the focus.

Moreover, the present disclosed method is targeted to evaluate focus from the full frame instead of using specific target points in the image, for example, only the image center. This method enables the user to get the optimally focused frame. When the user rotates the lens, the user gets a display of the achieved focus level and the point at which the best frame is achieved.

Furthermore, the present disclosed system generates audio or visual alert on change in the scene parameters beyond a corrective range and further indicates achievement of the optimum focus.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for obtaining optimal focus of an image capturing device comprising:
    a processing subsystem hosted on a server and configured to execute on a network to control bidirectional communications among a plurality of modules comprising:
        an image capturing module configured to receive a predetermined number of a first set of frames by calibration of the image capturing device;
        an image processing module operatively coupled to the image capturing module, wherein the image processing module is configured to:
            calculate focal values of each of the predetermined number of the first set of frames using a focal value calculation technique:
            identify a predefined threshold of the focal value among each of the focal values calculated for each of the predetermined number of the first set of frames; and
            determine a reference frame among each of the predetermined number of the first set of frames based on the predefined threshold of the focal value identified;
        an image comparison module operatively coupled to the image processing module, wherein the image comparison module is configured to:
            compare focal value of one or more live frames captured using the image capturing device with the focal value of reference frame determined; and
            select an optimal live frame from the one or more live frames when the focal value of the one or more live frames is greater than a predefined percentage of the focal value of the reference frame; and
        a notification module operatively coupled to the image comparison module, wherein the notification module is configured to notify an achievement of an optimal focal value range corresponding to the optimal live frame to an operator through one or more notification means.

2. The system of claim 1, wherein the predetermined number of first set of frames comprises two hundred and fifty number of frames.

3. The system of claim 1, wherein the predetermined number of first set of frames are received from an image focussed on a focus chart placed at a distance of approximately ten to hundred centimetres from the image capturing device.

4. The system of claim 1, wherein the image capturing device comprises an embedded image capturing device.

5. The system of claim 1, wherein the calibration of the image capturing device comprises at least one of a manual calibration of lens of the image capturing device or mechanised operation of the image capturing device.

6. The system of claim 1, wherein the focal value calculation technique comprises a Laplacian edge detection technique.

7. The system of claim 1, wherein the predefined threshold of the focal value is highest focal value.

8. The system of claim 1, wherein the predefined percentage of the focal value comprises a range of ninety five percent of the focal value.

9. The system of claim 1, wherein the one or more notification means comprises at least one of an audible notification, a display notification or a combination thereof.

10. The system of claim 9, wherein the display notification comprises a sequentially increasing and/or decreasing live focal values of the one or more live frames corresponding to the lens movement of the image capturing device in a plurality of directions to achieve the optimal live frame.

11. A method comprising:
    receiving, by an image capturing module of the processing subsystem, a predetermined number of a first set of frames by calibration of the image capturing device;
    calculating, by an image processing module of the processing subsystem, focal values of each of the predetermined number of the first set of frames using a focal value calculation technique;
    identifying, by the image processing module of the processing subsystem, a predefined threshold of the focal value among each of the focal values calculated for each of the predetermined number of the first set of frames;
    determining, by the image processing module of the processing subsystem, a reference frame among each of the predetermined number of the first set of frames based on the predefined threshold of the focal value identified;
    comparing, by an image comparison module of the processing subsystem, focal value of one or more live frames captured using the image capturing device with the focal value of reference frame determined;
    selecting, by the image comparison module of the processing subsystem, an optimal live frame from the one or more live frames when the focal value of the one or more live frames is greater than a predefined percentage of the focal value of the reference frame; and
    notifying, by a notification module of the processing subsystem, an achievement of an optimal focal value range corresponding to the optimal live frame to an operator through one or more notification means.

12. The method of claim 11, wherein calculating the focal values of each of the predetermined number of the first set of frames using a focal value calculation technique comprises calculating the focal values using a Laplacian edge detection technique.

* * * * *